US011354107B2

(12) United States Patent
Huang et al.

(10) Patent No.: US 11,354,107 B2
(45) Date of Patent: Jun. 7, 2022

(54) COMMUNICATING A DATA IMAGE FOR INSTALLING AN OPERATING SYSTEM

(71) Applicant: Hewlett-Packard Development Company, L.P., Houston, TX (US)

(72) Inventors: Yuan-Yang Huang, Taipei (TW); Lawrence Williams, Taipei (TW); Tian-Yan Huang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 513 days.

(21) Appl. No.: 15/521,989

(22) PCT Filed: Jan. 16, 2015

(86) PCT No.: PCT/US2015/011861
§ 371 (c)(1),
(2) Date: Apr. 26, 2017

(87) PCT Pub. No.: WO2016/114799
PCT Pub. Date: Jul. 21, 2016

(65) Prior Publication Data
US 2017/0329594 A1    Nov. 16, 2017

(51) Int. Cl.
*G06F 8/61* (2018.01)
*G06F 16/14* (2019.01)
*H04L 9/32* (2006.01)

(52) U.S. Cl.
CPC .............. *G06F 8/63* (2013.01); *G06F 8/61* (2013.01); *G06F 16/14* (2019.01); *H04L 9/3226* (2013.01)

(58) Field of Classification Search
CPC . G06F 8/63; G06F 17/301; G06F 8/61; G06F 16/14; H04L 9/3226
(Continued)

(56) References Cited

U.S. PATENT DOCUMENTS 5,717,930 A * 2/1998 Imai .......................... G06F 8/61
713/1
6,134,593 A * 10/2000 Alexander .............. G06F 21/10
705/26.1
(Continued)

FOREIGN PATENT DOCUMENTS

EP       1503282 A1    2/2005
TW       M490072 U    11/2014
WO       WO-99-59059 A1    11/1999

OTHER PUBLICATIONS

Fan et al., "Sensing Home: A Cost-Effective Design for Smart Home via Heterogeneous Wireless Networks", 2015, Sensors (Year: 2015).*
(Continued)

*Primary Examiner* — Wei Y Zhen
*Assistant Examiner* — Junchun Wu
(74) *Attorney, Agent, or Firm* — HP Inc. Patent Department

(57) ABSTRACT

Some examples provide a non-transitory computer readable medium having instructions stored thereon and executable by a processor of a client computing device to receive, from a server computing device, a unique identifier associated with the client computing device. The instructions are executable by the processor to receive, at the client computing device, user input including a password associated with the unique identifier. The instructions are executable by the processor to send the password to the server computing device for verification. The instructions are executable by the processor to receive, from the server computing device, a data image for installing a desired operating system on the client computing device, and doing so according to a user selection received at the client computing device.

21 Claims, 11 Drawing Sheets

(58) Field of Classification Search
USPC .......................................................... 717/177
See application file for complete search history.

(56) References Cited

U.S. PATENT DOCUMENTS

| | | | | |
|---|---|---|---|---|
| 7,000,231 | B1* | 2/2006 | Gold | G06F 8/63 |
| | | | | 711/173 |
| 7,644,264 | B1* | 1/2010 | Olsen | G06F 9/4416 |
| | | | | 713/2 |
| 7,702,896 | B1 | 4/2010 | Polyudov | |
| 8,489,922 | B2* | 7/2013 | Matthew | G06F 11/1415 |
| | | | | 714/15 |
| 8,621,211 | B1* | 12/2013 | Kishore | H04L 41/12 |
| | | | | 713/168 |
| 9,032,394 | B1* | 5/2015 | Shi | G06F 9/4411 |
| | | | | 717/178 |
| 2003/0192039 | A1* | 10/2003 | McConnell | G06F 9/44505 |
| | | | | 717/171 |
| 2004/0098426 | A1 | 5/2004 | Ishii et al. | |
| 2005/0188371 | A1* | 8/2005 | Bocking | G06F 8/61 |
| | | | | 717/178 |
| 2005/0216909 | A1* | 9/2005 | James | G06F 8/61 |
| | | | | 717/174 |
| 2006/0005016 | A1 | 1/2006 | Lee et al. | |
| 2007/0011674 | A1* | 1/2007 | Joo | G06F 9/4406 |
| | | | | 717/174 |
| 2007/0061790 | A1* | 3/2007 | Kay | G06F 21/125 |
| | | | | 717/145 |
| 2007/0129861 | A1 | 6/2007 | Hashiba et al. | |
| 2007/0239861 | A1* | 10/2007 | Reeves | G06F 8/61 |
| | | | | 709/222 |
| 2009/0106753 | A1* | 4/2009 | Wang | G06F 8/60 |
| | | | | 717/176 |
| 2010/0325687 | A1* | 12/2010 | Iverson | H04L 9/3236 |
| | | | | 726/1 |
| 2011/0010517 | A1* | 1/2011 | Fujimura | G06F 21/78 |
| | | | | 711/164 |
| 2011/0047129 | A1* | 2/2011 | Wang | G06F 11/1469 |
| | | | | 707/675 |
| 2011/0099547 | A1* | 4/2011 | Banga | G06F 8/61 |
| | | | | 717/176 |
| 2011/0167249 | A1 | 7/2011 | Ahn | |
| 2012/0311450 | A1 | 12/2012 | Gupta | |
| 2013/0019237 | A1* | 1/2013 | Pardehpoosh | G06Q 30/0609 |
| | | | | 717/171 |
| 2013/0125107 | A1* | 5/2013 | Bandakka | G06F 11/1448 |
| | | | | 717/171 |
| 2013/0346964 | A1* | 12/2013 | Nobuoka | G06F 13/102 |
| | | | | 717/177 |
| 2014/0156528 | A1* | 6/2014 | Frechette | G06Q 20/3278 |
| | | | | 705/44 |
| 2014/0201728 | A1* | 7/2014 | Du Toit | G06F 8/65 |
| | | | | 717/171 |
| 2015/0074786 | A1* | 3/2015 | Hwang | H04L 63/0861 |
| | | | | 726/9 |
| 2017/0329594 | A1* | 11/2017 | Huang | H04L 9/3226 |

OTHER PUBLICATIONS

Chen et al., "An Advanced ECC Dynamic ID-Based Remote Mutual Authentication Scheme for Cloud Computing", 2011, IEEE (Year: 2011).*

Madhusudhan et al., "Dynamic ID-based remote user password authentication schemes using smart cards", 2012, Elsevier Ltd. (Year: 2012).*

Josang et al., "Trust Requirements in Identity Management", 2005, AISW (Year: 2005).*

By ESGI Advisor in Rogue Anti-Spyware Program, "Smart Data Recovery," 2012, pp. 1-4, Enigma Software Group USA, LLC.

* cited by examiner

COMMUNICATING A DATA IMAGE FOR INSTALLING AN OPERATING SYSTEM

BACKGROUND

Computer systems are susceptible to hardware or software-based errors and, at times, such errors can cause the computer systems to fail entirely. Complete failure of a computer system can impair a practical use of the computer system by a user or can, for instance, prevent a user from accessing data stored on the computer system. To address certain failures, computer systems often include a mechanism by which a user can partially or completely restore their operation. For example, a computer system can include hardware or software-based features that facilitate restoration of original data stored on a storage device (of the computer system) from backup data, or that facilitate restoration of operation of some or all of an operating system that manages operation of the computer system.

BRIEF DESCRIPTION OF THE DRAWINGS

Certain examples are described in the following detailed description in reference to the following drawings.

DETAILED DESCRIPTION OF SPECIFIC EXAMPLES

Figure 1:
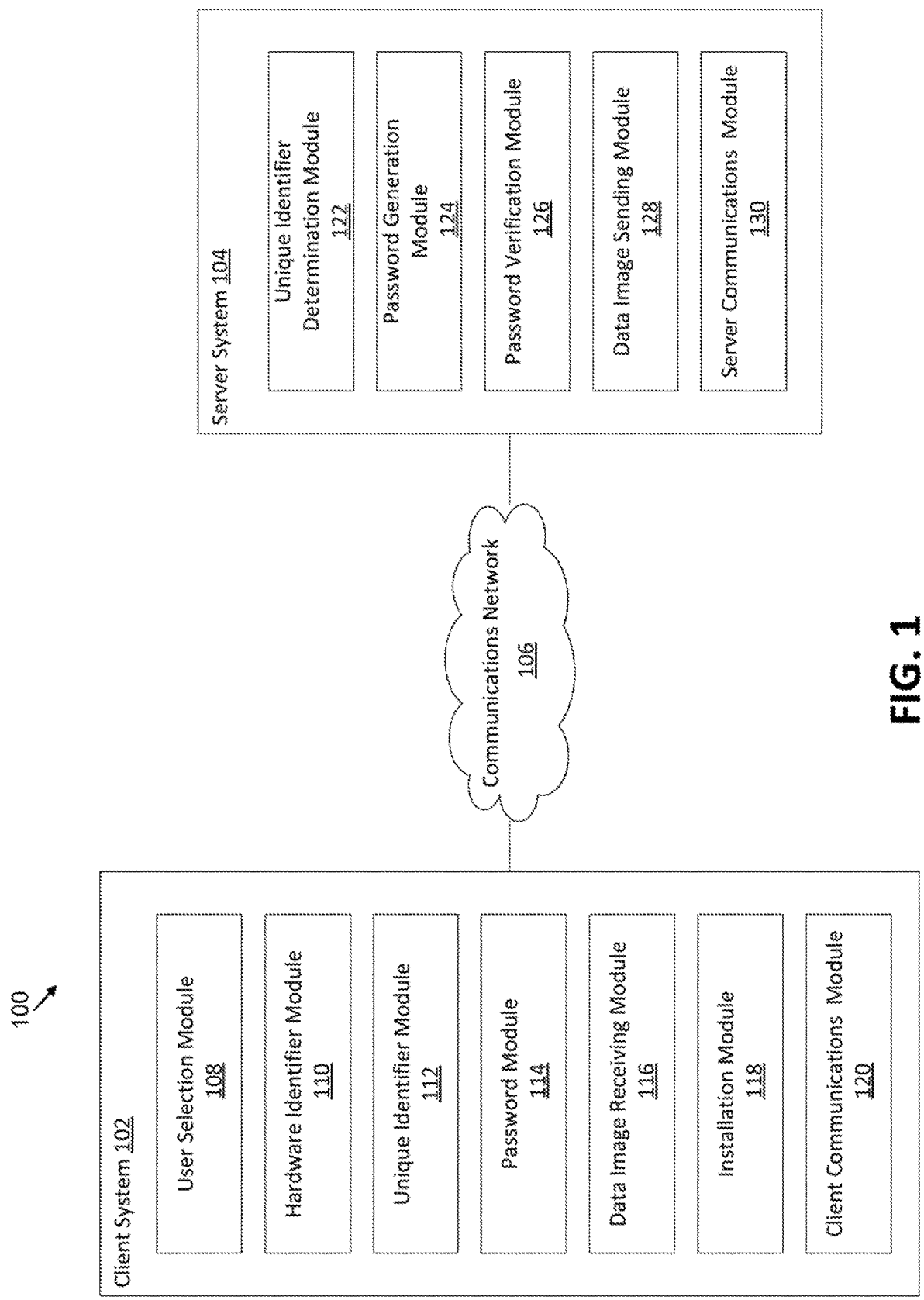
FIG. 1 illustrates an example environment including an example client system in communication with an example server system.

This disclosure describes example techniques for communicating a data image for installing a desired operating system. For instance, techniques described herein can enable a client system to receive a data image, for installing a desired operating system, from a server system for use at the client system. As used herein, installing a desired operating system on a client system can include replacing an existing operating system currently, installed on the client system, with the desired operating system. Additionally, installing a desired operating system on a client system can include restoring, upgrading, or downgrading an existing operating system currently, installed on the client computing device, based on (e.g., using) the desired operating system. Furthermore, it will be understood that a given data image may be configured for certain types of installation and not for others. For instance, an example data image may be configured for upgrading or downgrading an existing operating system installed on a client system, but may not be capable of recovering or re-installing the existing operating system.

For instance, with the data image for installing the desired operating system, the client system may utilize the data image to restore (e.g., fix or replace) an existing operating system currently installed on the client system. The client system may utilize the received data image to reinstall the existing operating system on the client system, or to restore portions of the existing operating system as an attempt to address (e.g., remedy) the malfunction/damage. Such a restoration may occur when, for example, data on a local storage device of a client system (e.g., hard drive) suffers damage that renders an operating system currently installed on the client system inoperative (e.g., operating system does not boot, thereby impeding practical use of the client system or access to user data on the client system). Traditionally, for a client system suffering from an inoperative operating system, a user would use an external computer readable medium, such as a disc (e.g., CD or DVD) or a universal serial bus (USB) drive, including a data image that facilitates recovery of the inoperative operating system (e.g., restore the malfunctioning operating system to functionality). As used herein, a recovery of an existing operating system installed on a client system using a data image can involve using data from the data image to replace or repair a portion of the existing operating system as stored on the client system (e.g., a file).

In some examples, the client system does not have an existing operating system and may utilize the received data image to install the desired operating system on the client system. Additionally, as described herein, the client system utilizes the data image to upgrade or downgrade an existing operating system (e.g., first version of a particular type of operating system) currently installed on the client system to the desired operating system (e.g., second version of the particular type of operating system).

Various examples described herein obviate the need for a user of client system to possess an external computer-readable medium, such as a USB memory stick, CD or DVD, storing a data image that facilitates installing a desired operating system on the client system. Also, various example described herein can obviate the need for a user of a client system to request, wait, and receive, from a vendor (e.g., of the client system) an external computer-readable medium storing a data image for installing a desired operating system on the client system.

According to some examples, a process for installing, upgrading, downgrading, or restoring a desired operating system on a client system is initiated at the request of a user at the client system. For instance, the user may initiate the process during or after a power-on self-test (POST) process by the basic input/output operating system (BIOS) of the client system. Additionally, the user may initiate the process by using a human interface coupled to the client system. This can include, for example, the user pressing the DEL, F11, or F12 key on the keyboard coupled to the client system.

For some examples, a user at a client system is presented with a set of options for installing a desired operating system on the client system, which can include upgrading, downgrading, or restoring an existing operating system installed on the client system. The set of options may be presented once a process for installing, upgrading, downgrading, or restoring an operating system on a client system is initiated (e.g., by user pressing key on the keyboard). The user may select one of the set of options, and one or more subsequent operations described herein may be performed based on the user selection. For instance, where the user selection indicates a desire to upgrade the existing operating system on the client system with the desired operating system, the user selection may cause the client system to eventually receive a data image capable of upgrading the existing operating system to the desired operating system.

In various examples, the client system receives a unique identifier associated with the client system. The unique identifier may be received by the client system subsequent to a user at the client system selecting an option for installing a desired operating system on the client system. The client system may receive the unique identifier from a server system, which provides the unique identifier to the client system based on a hardware identifier associated with the client system. The client system may provide (e.g., send) the hardware identifier to the server system subsequent to the user selecting the option for installing the desired operating system on the client system. Depending on the example, the hardware identifier provided to the server system may be one obtained by the client system during a boot process for the client system (e.g., during, before, or after a BIOS POST process).

A hardware identifier associated with the client system can include a part number, a model number, a serial number, or the like. For instance, a hardware identifier associated with the client system can be a part number or a serial number associated with a hardware component included by the computer system, such as a network card, video card, storage device, or motherboard. As another example, a hardware identifier associated with the client system can be a model number assigned to the computer system by the vendor of the computer system. Additionally, a hardware identifier associated with the client system may be one generated based on one or more identifiers associated with hardware components of the computer system. For instance, a hardware identifier for a computer system can be generated by combining together two or more of (e.g., concatenating) a serial number of a central processing unit (CPU) of the computer system, a serial number of a hard drive (HDD) of the computer system, a media access control (MAC) of a network adapter of the computer system, and a serial number assigned to the computer system itself. A hardware identifier associated with the client system may or may not be unique to the computer system.

Once received at a client system, a unique identifier may be utilized by a user at the client system to obtain (e.g., request) a password associated with the unique identifier. For some examples, the password is one that facilitates the client system receiving a data image for installing a desired operating system on the client system. For instance, the password may be one that once verified by a server system, authorizes the client system to receive, from the server system, a data image for installing a desired operating on the client system. The data image received from the server system may be one capable of installing the desired operating system on the client system according to an option, selected at the client system by the user, for installing a desired operating system on the client system. For certain examples, the password is generated based on the unique identifier associated with the client system. Generating the password in this manner may comprise obtaining, based on the unique identifier, a configuration of the client system and generating the password based on the configuration. Additionally, the password may be a limited-use (e.g., one-time-use) password that is invalid (e.g., expires) after a condition of the password's limited is no longer met (e.g., after its first successful use, after an expiration time, after an expiration date, or some combination thereof).

In certain examples, the user enters the password at the client system, the client system sends the password to the server system, and the server system sends the data image to the client system once the password is verified. For where the password is a one-time-use password, the server system may invalidate the password after the password's first successful verification, thereby preventing its subsequent use (e.g., by the same user or another user at a different client system).

Depending on the example, a password may be obtained by a user of a client system in several ways, including a call center or a website. For instance, the user may contact a call center with the intent of obtaining the password, the user may provide the unique identifier to the call center (e.g., to an automated phone system or a real-life operator of the call center), and user may receive the password associated with the unique identifier (e.g., in response to providing the unique identifier). In another instance, the user may access a website (e.g., technical support website or an online store) by way of another client system (e.g., mobile phone or tablet), the user may submit the unique identifier to the website, and the user may eventually receive the password associated with the unique identifier from the website (e.g., in response to submitting the unique identifier).

In particular examples, the user password is verified by a server system. Following successful verification, a client system may receive from the server system a data image for installing a desired operating system on the client system. As described herein, the data image received may be one for installing the desired operating system on the client system according to a user selection received at the client system (e.g., user selection of an option for installing the desired operating system on the client system). Once the data image is received, installation of the desired operating system on the client system may be initiated based on at least a portion of the data image. Additionally, the installation may be initiated according to the user selection (e.g., upgrade, downgrade, or restore) received at the client system.

For various examples, processes described herein can be initiated and performed before any primary operating system of a client system has begun to boot, and, in particular, may be initiated and performed when there is no primary operating system installed on the client system or when the primary operating system is not accessible. This may be achieved by implementing one or more of the processes described herein as part of a BIOS of the client system.

According to some examples, when a client system boots, a user will have an opportunity to initiate a process for installing a desired operating system on the client system, which can include reinstalling, recovering, upgrading or downgrading an existing operating system installed on the client system with the desired operating system. The user may request initiate the process by pressing a function key (e.g., F11 or F12 key) or a command key (e.g., DEL key) on a keyboard coupled to the client system. After initialization, the process may determine whether the client system has a locally-stored data image (e.g., data image on a recovery data partition of a local storage device) for installing (e.g., upgrading, downgrading, reinstalling, or restoring) the desired operating system on the client system. In absence of the locally-stored data image, the process will prompt the user with a set of options for installing a desired operating system on the client system using a data image obtained from the server system, which includes an implicit request for obtaining the data image from the server system.

Upon a user selection of an option for installing a desired operating system on a client system using a data image obtained from a server system, the client system may load a network-enabled shell, such a Unified Extensible Firmware Interface (UEFI) shell with a network driver from the firmware of the client system. Additionally, the client system may load a shell script (e.g., UEFI shell script) that obtains software for downloading the data image for installing the desired operating system from the server system.

For instance, the client system may obtain a Window Pre-installation Environment (WinPE) from a vendor's recovery server and may load the WinPE into memory of the client system. Use of the WinPE can enable the client system to prepare a local storage device of the client system to receive software for obtaining a data image from the server system (e.g., a vendor's recovery server), may obtain the software from the server system, may store the software on the local storage device, and may initiate the stored software to obtain the data image for installing the desired operating system. For instance, the WinPE may enable the client system to format or otherwise prepare a recovery data partition on a local storage device (e.g., hard drive) of the client system, obtain recovery software for downloading the data image from a recovery software (e.g., provided by a vendor of the client system), store the recovery software, and initiate the recovery software from the local storage device (e.g., by soft reset of the client system) to download the data image.

In obtaining the data image from the server system, the software for obtaining a data image from a server system may send to the server system a hardware identifier (e.g., unique hardware identifier) associated with the client system. In response, the software may receive from the server system a unique identifier associated (e.g., unique number) associated with the hardware identifier. A user at the client system can enter the unique identifier through another client system (e.g., application or website through a mobile phone or desktop different from the client system) or provide the unique identifier to a call center (e.g., an automated phone system or operator). In addition to the unique identifier, the user may provide their user selection with respect to the data image to be obtained from the server system, such as a user selection for upgrading, re-installing, or downgrading their client system using the data image. In return for the unique identifier, the user will receive a password (e.g., a one-time-use password), which the user can enter into the software and authorize the client system to obtain the data image from the server system once the password is successfully verified by the server system. The data image obtained from the server system may be saved to a local storage device of the client system, and an installation process using the obtained data image can be initiated based on the user's selection of installation options (e.g., upgrading, installing, recovering reinstalling, or downgrading the client system based on the data image).

FIG. 1 illustrates an example environment including an example client system in communication with an example server system. In particular, environment 100 includes a client system 102 in communication with a server system 104 over a communications network 106. As shown, the client system 102 includes a user selection module 108, a hardware identifier module 110, a unique identifier module 112, a password module 114, a data image receiving module 116, an installation module 118, and client communications module 120. As also shown, the server system 104 includes a unique identifier determination module 122, a password generation module 124, a password verification module 126, a data image sending module 128, and a server communications module 130.

Depending on the example, the client system 102 may comprise a desktop, laptop, a hand-held computing device (e.g., personal digital assistants, smartphones, tablets, etc.), a workstation, and the like. Additionally, depending on the example, the server system 104 may comprise one or more servers, which may be operating on, or implemented, using one or more cloud-based resources, such as a System-as-a-Service (SaaS), Platform-as-a-Service (PaaS), or Infrastructure-as-a-Service (IaaS). In various examples, the components or the arrangement of components in the environment 100 may differ from what is depicted in FIG. 1. For instance, the server system 104 can include more or less components than those depicted in FIG. 1.

As used herein, modules and other components of various examples may comprise, in whole or in part, machine-readable instructions or electronic circuitry. For instance, a module may comprise computer-readable instructions executable by a processor to perform one or more functions in accordance with various examples described herein. Likewise, in another instance, a module may comprise electronic circuitry to perform one or more functions in accordance with various examples described herein. The elements of a module may be combined in a single package, maintained in several packages, or maintained separately.

The communications network 106 permits data to be communicated between the client system 102 and the server system 104 in accordance with various examples described herein. In some examples, the communications network 106 may comprise one or more local or wide-area communications networks, such as the Internet, WiFi networks, cellular networks, private networks, public networks, and the like.

The user selection module 108 may facilitate receiving, from a user at the client system 102, a user selection with respect to installing a desired operating system on the client system 102. For instance, once a process for installing the desired operating system on the client system 102 has been initiated, the user selection module 108 may present the user with a menu listing possible options with respect to installing the desired operating system on the client system 102. Examples of options presented to the user can include, without limitation, newly installing or reinstalling the desired operating system on the client system 102 (e.g., where an existing operating system is not already installed on the client system 102), restoring an existing operating system installed on the client system 102 using the desired operating system, upgrading the existing operating system installed on the client system 102 to the desired operating system, and downgrading the existing operating system installed on the client system 102 to the desired operating system. The options presented may depend on the current state of the client system 102, such as whether the client system 102 already has an existing operating system installed, what type of the existing operating system is installed, or what version of the existing operating system is installed.

As described herein, the process for installing the desired operating system may be initiated at the request of the user of the client system 102 (e.g., pressing F11 key on a keyboard coupled to the client system 102), and the request may be received during a boot process of the client system 102. The user selection module 108 may present the user with options for installing the desired operating system after the process has been initiated. Additionally, the user selection module 108 may present the user with options after it is determined (e.g., by a BIOS of the client system 102) that a data partition to recover an operating system is not present on a local storage device coupled to the client system 102. The user selection module 108 may present the options before an existing operating system installed on the client system 102 (e.g., the primary operating system) has started to boot, and may present the options in a graphical menu displayed to the user. For certain examples, some or all of the user selection module 108 as part of a BIOS of the client system 102.

The hardware identifier module 110 may facilitate determining a hardware identifier associated with the client system 102. As described herein, hardware identifiers can comprise a serial number of the client system 102, a product number of the client system 102, a hardware identifier of a component of the client system 102, or some combination thereof. Determining the hardware identifier may comprise the hardware identifier module 110 obtaining some or all of the hardware identifier during a boot process of the client system 102. In particular examples, some or all of the hardware identifier is obtained during a secure boot process, thereby providing a trusted hardware identifier associated with the client system 102 for use in subsequent processed described herein.

The unique identifier module 112 may facilitate obtaining a unique identifier associated with the client system 102. For example, the unique identifier module 112 can obtain the unique identifier by receiving the unique identifier from the server system 104. Further, the unique identifier module 112 may receive the unique identifier in response to client system 102 providing the hardware identifier, determined by the hardware identifier module 110, to the server system 104. Depending on the example, the unique identifier can comprise alpha characters, numeric characters, or alphanumeric characters. Once obtained, the unique identifier may be provided (e.g., displayed) to a user at the client system 102.

The password module 114 may facilitate the client system 102 receiving a password from a user at the client system 102. For instance, the password module 114 may receive a password from the user by way of user input entered (by the user) using a human interface device (e.g., keyboard or mouse) coupled to the client system 102. In various examples, the password is one that can authorize the client system 102 to receive a data image, from the server system 104, for installing a desired operating system. Depending on the example, the password may comprise alpha characters, numeric characters, or alphanumeric characters. As described herein, the password provided by the user may be one associated with the unique identifier obtained by the unique identifier module 112. Additionally, the password may be a limited-use (e.g., one-time-use) password, which may be invalidated (e.g., expired) by the server system 104 after the server system 104 receives the password from the client system and successfully verifies the password the first time. The password module 114 may prompt the user for a password (e.g., with an on-screen text box) subsequent to the unique identifier module 112 obtaining the unique identifier from the server system 104. Once received a password is received, the password module 114 may provide (e.g., send) the password to the server system 104 to facilitate receiving a data image, from the server system 104, for installing a desired operating system.

The data image receiving module 116 may facilitate receiving a data image, from the server system 104, for installing a desired operating system. The data image receiving module 116 may receive the data image from the server system 104 in response to the server system 104 verifying a password provided to the server system 104 by the client system 102 (e.g., by the password module 114). Depending on the example, the data image may comprise a set of files, which may include an executable file, a compressed file, an archive file (e.g., an ISO 9660 disk image file), and the like. The data image receiving module 116 may utilize an Internet-based protocol, such as file transfer protocol (FTP) or a hypertext transfer protocol (HTTP), to facilitate transfer of the file from the server system 104 to the client system 102 over the communications network 106. Portions of the data image received by the data image receiving module 116 may be stored (e.g., temporarily) on a local storage device (e.g., hard drive) of the client system 102.

The installation module 118 may facilitate initiating an installation (e.g., upgrade, reinstall, downgrade, or restore) of a desired operating system on the client system 102 using at least a portion of the data image received by the client system 102 (e.g., by the data image receiving module 116) from the server system 104. In some instances, the installation module 118 can initiate the installation before the data image has been completely received from the server system 104 (e.g., a partial download).

The client communications module 120 may facilitate communication between the client system 102 and the server system 104 over the communications network 106. For instance, the client communications module 120 may facilitate the client system 102 sending a hardware identifier associated with the client system 102 to the server system 104, or sending a password associated with the client system 102 to the server system 104. The client communications module 120 may facilitate may further facilitate the client system 102 receiving from the server system 104 a data image for installing a desired operating system on the client system 102.

With reference to the server system 104, the unique identifier determination module 122 may facilitate the server system 104 determining a unique identifier associated with the client system 102, and may determine the unique identifier based on a hardware identifier associated with the client system 102. As described herein, the hardware identifier module 110 of the client system 102 may provide the server system 104 with a hardware identifier associated with the client system 102. Determining a unique identifier associated with the client system 102 may comprise the unique identifier determination module 122 generating the unique identifier based on the hardware identifier associated with the client system 102. In some examples, the unique identifier is pre-determined and the unique identifier determination module 122 determines the unique identifier associated with the client system 102 by associating the pre-determined unique identifier with the client system 102 (e.g., its hardware identifier).

The password generation module 124 may facilitate generating a password associated with the client system 102 and, in particular, may facilitate generating a password based on a unique identifier of the client system 102. The password may be generated at the time a user of the client system 102 requests, from the server system 104, a password that authorizes the client system 102 to receive a data image for installing a desired operating system on the client system 102. The password may be generated when a unique identifier is generated and stored for subsequent retrieval. Additionally, the password may be generated when a unique identifier determination module 122 provides a unique identifier to a user at the client system 102.

For some examples, generating the password based on the unique identifier of the client system 102 comprises obtaining a configuration of the client system 102 based on the unique identifier, and generating the password based on the configuration. Depending on the example, the configuration may comprise a software configuration, a hardware configuration, or some combination of both.

As described herein, the password may be provided to a user at the client system 102 by several methods, including a website or a call center. For instance, the user at the client system 102 may contact a call center operator by telephone call, provide a unique identifier associated with the client system 102 to the call center operator, the operator may submit the unique identifier to the password generation module 124, and the password generation module 124 may provide the call center operator with a password (e.g., associated with the unique identifier) to return to the user over the telephone call.

The password verification module 126 may facilitate verification of a password submitted to the server system 104 by the client system 102. As described herein, when a user at the client system 102 attempts to obtain a disk for installing a desired operating system on the client system 102, the user may be prompted for a password that would authorize the client system 102 to receive the data image from the server system 104. Where the password is a limited-use password, such as a one-time-user password, the password verification module 126 may invalidate the password after condition of the password's limited use is no longer met. For instance, where the password is a one-time-use password, the password verification module 126 may expire the password after its first successful verification during use by a user. Depending on the example, the limited-use password may have more than one condition that can limit its use. In such cases, the limited-use password may be invalidated after some or all of the conditions of limited use are no longer met.

The data image sending module 128 may facilitate the server system 104 sending, to the client system 102, a data image for installing a desired operating system on the client system 102. According to some examples, the server system 104 may send the data image to the client system 102 subsequent to successful verification of a password provided by the client system 102. The particular data image sent to the client system 102 by the data image sending module 128 may be determined based on the password successfully verified by the password verification module 126. For example, the password successfully verified by the password verification module 126 may be associated with a given data image capable of installation, reinstallation, and recovery, but not an upgrade or downgrade. Based on the association, the data image sending module 128 may send the given data image capable of installation, reinstallation, and recovery to the client system 102 over the communications network 106.

The server communications module 130 may facilitate communication between the server system 104 and the client system 102 over the communications network 106. The server communications module 130, for example, may facilitate the server system 104 receiving a unique identifier from a call center operator, or through an application or website accessed by a user of the client system 102 while the user is at client system other than the client system 102 (e.g., mobile phone). The server communications module 130 may facilitate the server system 104 receiving from the client system 102 a password entered at the client system by the user. The server communications module 130 may also facilitate the server system 104 sending the client system 102 a data image for installing a desired operating system on the client system 102.

Figure 2:
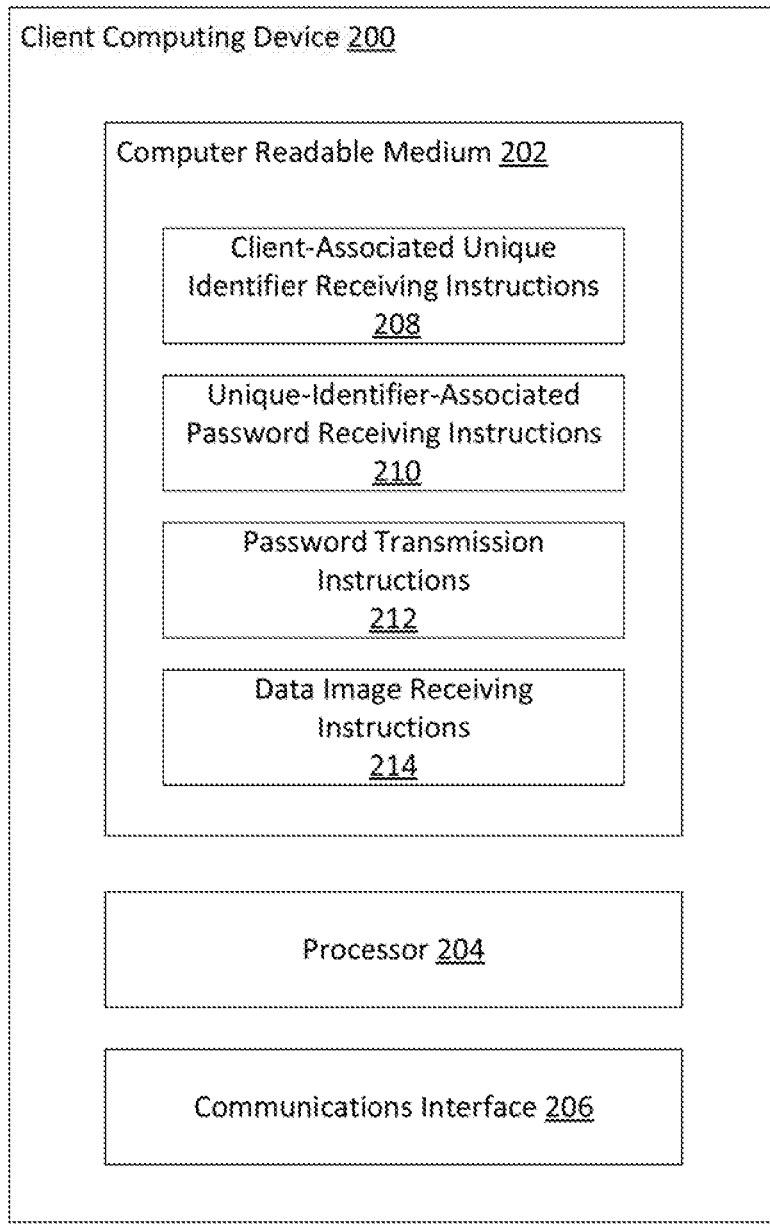
FIG. 2 illustrates an example client computing device.

FIG. 2 illustrates an example client computing device 200. As shown, the client computing device 200 includes a computer-readable medium 202, a processor 204, and a communications interface 206. In various examples, the components or the arrangement of components of the client computing device 200 may differ from what is depicted in FIG. 2. For instance, the client computing device 200 can include more or less components than those depicted in FIG. 2.

The computer-readable medium 202 may be any electronic, magnetic, optical, or other physical storage device that stores executable instructions. For example, the computer-readable medium 202 may be a Random Access Memory (RAM), an Electrically-Erasable Programmable Read-Only Memory (EEPROM), a storage drive, an optical disc, or the like. The computer-readable medium 202 can be encoded to store executable instructions that cause the processor 204 to perform operations in accordance with various examples described herein. In various examples, the computer-readable medium 202 is non-transitory. As shown in FIG. 2, the computer-readable medium 202 includes client-associated unique identifier receiving instructions 208, unique-identifier-associated password receiving instructions 210, password transmission instructions 212, and data image receiving instructions 214.

For certain examples, the computer-readable medium 202 includes instructions 208, 210, 212, and 214 and a BIOS for the client computing device 200, and the BIOS comprises at least one of the instructions 208, 210, 212, and 214. In some examples, the computer-readable medium 202 comprises a data partition to recover an installing operating system existing on the client computing device 200, and the data partition includes instructions 208, 210, 212, and 214.

The processor 204 may be one or more central processing units (CPUs), microprocessors, or other hardware devices suitable for retrieval and execution of one or more instructions stored in the computer-readable medium 202. The processor 204 may fetch, decode, and execute the instructions 208, 210, 212, and 214 to enable the client computing device 200 to perform operations in accordance with various examples described herein. For some examples, the processor 204 may include one or more electronic circuits comprising a number of electronic components for performing the functionality of one or more of the instructions 208, 210, 212, and 214.

The client-associated unique identifier receiving instructions 208 may cause the processor 204 to receive, from a server computing device, a unique identifier associated with the client computing device 200. As described herein, the unique identifier may be provided in response to the client computing device 200 providing the server computing device with a hardware identifier associated with the client computing device 200. The unique identifier received by the processor 204 may be associated with the hardware identifier associated with the client computing device 200.

The unique-identifier-associated password receiving instructions 210 may cause the processor 204 to receive, from a user at the client computing device 200, a password authorizing the client computing device 200 to receive, from a server computing device, a data image for installing a desired operating system. As described herein, the processor 204 may receive the password as user input entered at the client computing device 200, by the user, using a human interface device, such as a keyboard or mouse.

The password transmission instructions 212 may cause the processor 204 to transmit the password received from the user to the server computing device. As described herein, the server computing device will attempt to verify the password.

The data image receiving instructions 214 may cause the processor 204 to receive the data image from the server computing device. As described herein, the server computing device will send, and the processor 204 will receive, the data image after the server client computing device has successfully verified the password received from the processor 204. In various examples, the successful verification of the password authorizes the client computing device 200 to receive the data image from the server computing device.

Figure 3:
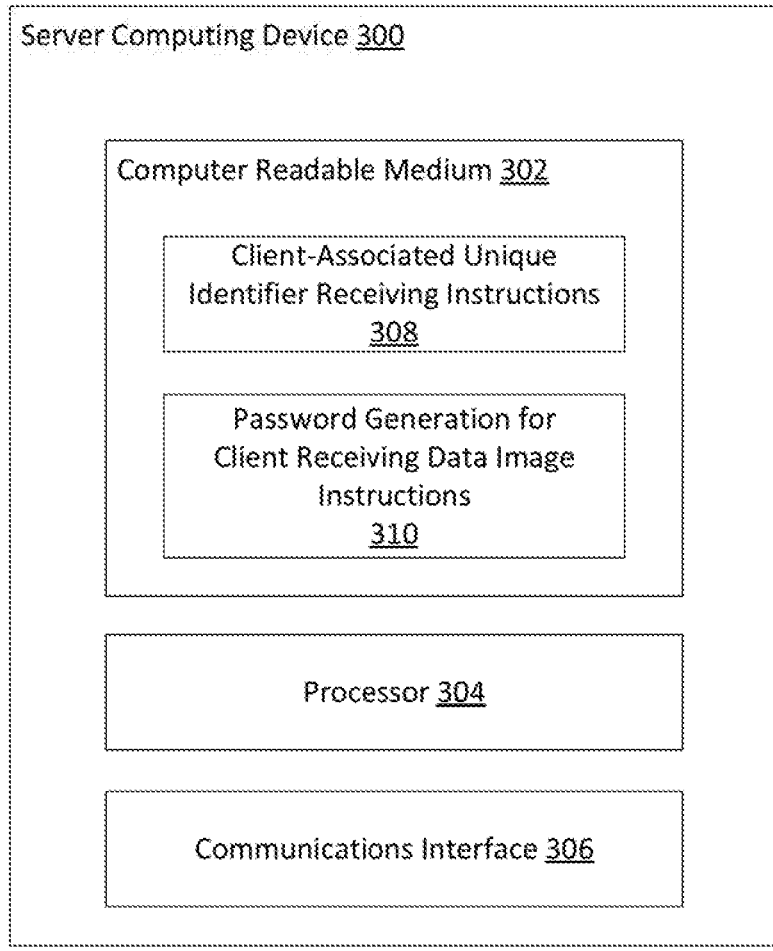
FIGS. 3-4 illustrate example server computing devices.

FIG. 3 illustrates an example server computing device 300. As shown, the server computing device 300 includes a computer-readable medium 302, a processor 304, and a communications interface 306. In various examples, the components or the arrangement of components of the server computing device 300 may differ from what is depicted in FIG. 3. For instance, the server computing device 300 can include more or less components than those depicted in FIG. 3.

As described herein, the computer-readable medium 302 may be any electronic, magnetic, optical, or other physical storage device that stores executable instructions. The computer-readable medium 302 can be encoded to store executable instructions that cause the processor 304 to perform operations in accordance with various examples described herein. In various examples, the computer-readable medium 302 is non-transitory. As shown in FIG. 3, the computer-readable medium 302 includes client-associated unique identifier receiving instructions 308, and password generation for client receiving data image instructions 310.

As also described herein, the processor 304 may be one or more central processing units (CPUs), microprocessors, or other hardware devices suitable for retrieval and execution of one or more instructions stored in the computer-readable medium 302. The processor 304 may fetch, decode, and execute the instructions 308 and 310 to enable the server computing device 300 to perform operations in accordance with various examples described herein. For some examples, the processor 304 may include one or more electronic circuits comprising a number of electronic components for performing the functionality of one or more of the instructions 308 and 310.

The client-associated unique identifier receiving instructions 308 may cause the processor 304 to receive a unique identifier that is associated with the client computing device. For instance, a user of the client computing device may contact a call center by telephone and provide the unique identifier to a call center operator over the telephone call, the call center operator may enter the unique identifier into their local computing device (e.g., using a mouse or keyboard coupled to the local computing device), and the processor 304 of the server computing device 300 may receive the unique identifier from the call center operator's local computing device (e.g., over a communications network). In another instance, the user of the client computing device may enter the unique identifier into a website (e.g., vendor technical support website) hosted by a webhost computing device, and the processor 304 of the server computing device 300 may receive the unique identifier from the webhost computing device.

The password generation for client receiving data image instructions 310 may cause the processor 304 to generate a password based on the unique identifier received by the processor 304. As described herein, generating the password based on the unique identifier of a client computing device may comprise obtaining a configuration of the client computing device based on the unique identifier, and generating the password based on the configuration. Depending on the example, the configuration may comprise be a software configuration, a hardware configuration, or some combination of both.

Figure 4:
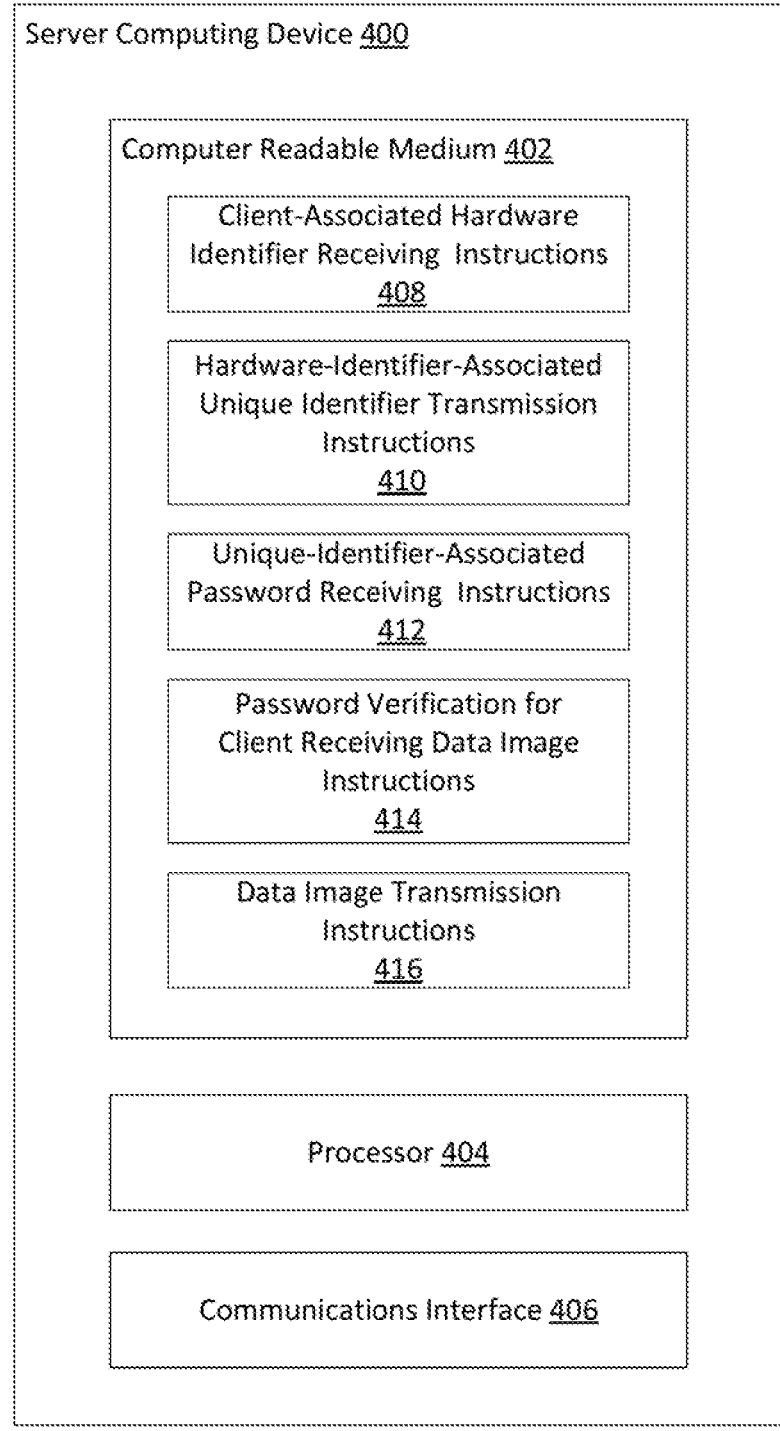

FIG. 4 illustrates an example server computing device 400. As shown, the server computing device 400 includes a computer-readable medium 402, a processor 404, and a communications interface 406. In various examples, the components or the arrangement of components of the server computing device 400 may differ from what is depicted in FIG. 4. For instance, the server computing device 400 can include more or less components than those depicted in FIG. 4.

As described herein, the computer-readable medium 402 may be any electronic, magnetic, optical, or other physical storage device that stores executable instructions. The computer-readable medium 402 can be encoded to store executable instructions that cause the processor 404 to perform operations in accordance with various examples described herein. In various examples, the computer-readable medium 402 is non-transitory. As shown in FIG. 4, the computer-readable medium 402 includes client-associated hardware identifier receiving instructions 408, hardware-identifier-associated unique identifier transmission instructions 410, unique-identifier-associated password receiving instructions 412, password verification for client receiving data image instructions 414, and data image transmission instructions 416.

As also described herein, the processor 404 may be one or more central processing units (CPUs), microprocessors, or other hardware devices suitable for retrieval and execution of one or more instructions stored in the computer-readable medium 402. The processor 404 may fetch, decode, and execute the instructions 408, 410, 412, 414, and 416 to enable the server computing device 400 to perform operations in accordance with various examples described herein. For some examples, the processor 404 may include one or more electronic circuits comprising a number of electronic components for performing the functionality of one or more of the instructions 408, 410, 412, 414, and 416.

The client-associated hardware identifier receiving instructions 408 may cause the processor 404 to receive from a client computing device a hardware identifier associated with the client computing device. The hardware-identifier-associated unique identifier transmission instructions 410 may cause the processor 404 to send, to the client computing device, a unique identifier associated with the hardware identifier, where the hardware identifier may be one associated with the client computing device.

The unique-identifier-associated password receiving instructions 412 may cause the processor 404 to receive from the client computing device a password associated (e.g., generated based on) the unique identifier. As described herein, the password may be one entered at the client computing device by a user of the client computing device. Additionally, the password may be initially provided to the user in response to the user providing the unique identifier to a call center or a website.

The password verification for client receiving data image instructions 414 may cause the processor 404 to verify a password received from a client computing device. The data image transmission instructions 416 may cause the processor 404 to send the data image to the client computing device in response to the password being successfully verified by the processor 404.

Figure 5:
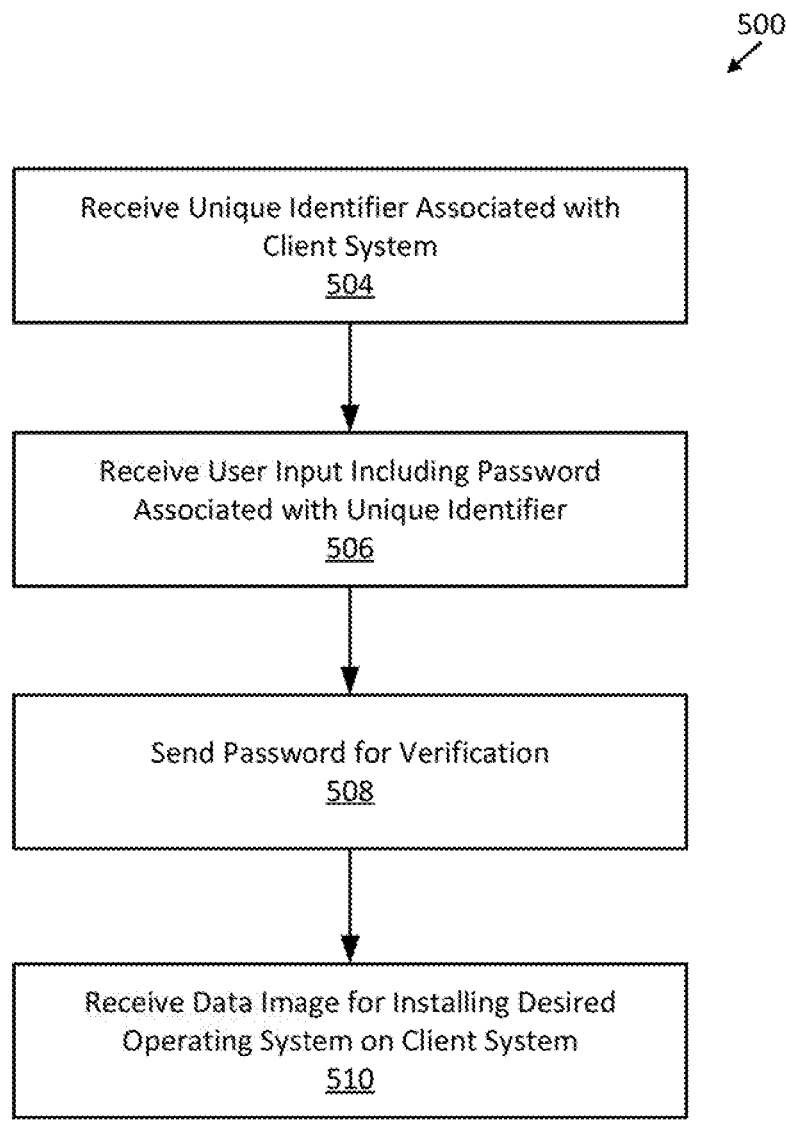
FIGS. 5-7 illustrate example methods for receiving a data image at an example client system.

FIG. 5 illustrates an example methods 500 for receiving a data image at an example client system. Although execution of method 500 is described below with reference to the client system 102 of FIG. 1, other suitable systems or devices for execution of method 500 can be possible, such as the client computing device 200 of FIG. 2. The method 500 may be implemented in the form of executable instructions stored on a computer-readable medium or in the form of electronic circuitry.

In FIG. 5, method 500 begins at block 504, with the client system 102 receiving a unique identifier associated with the client system 102. At block 506, the client system 102 receives user input including a password associated with the unique identifier received at block 504. At block 508, the client system 102 sends the password, received at block 506, to the server system 104 for verification. At block 510, the client system 102 receives a data image for installing a desired operating system on the client system 102.

Figure 6:
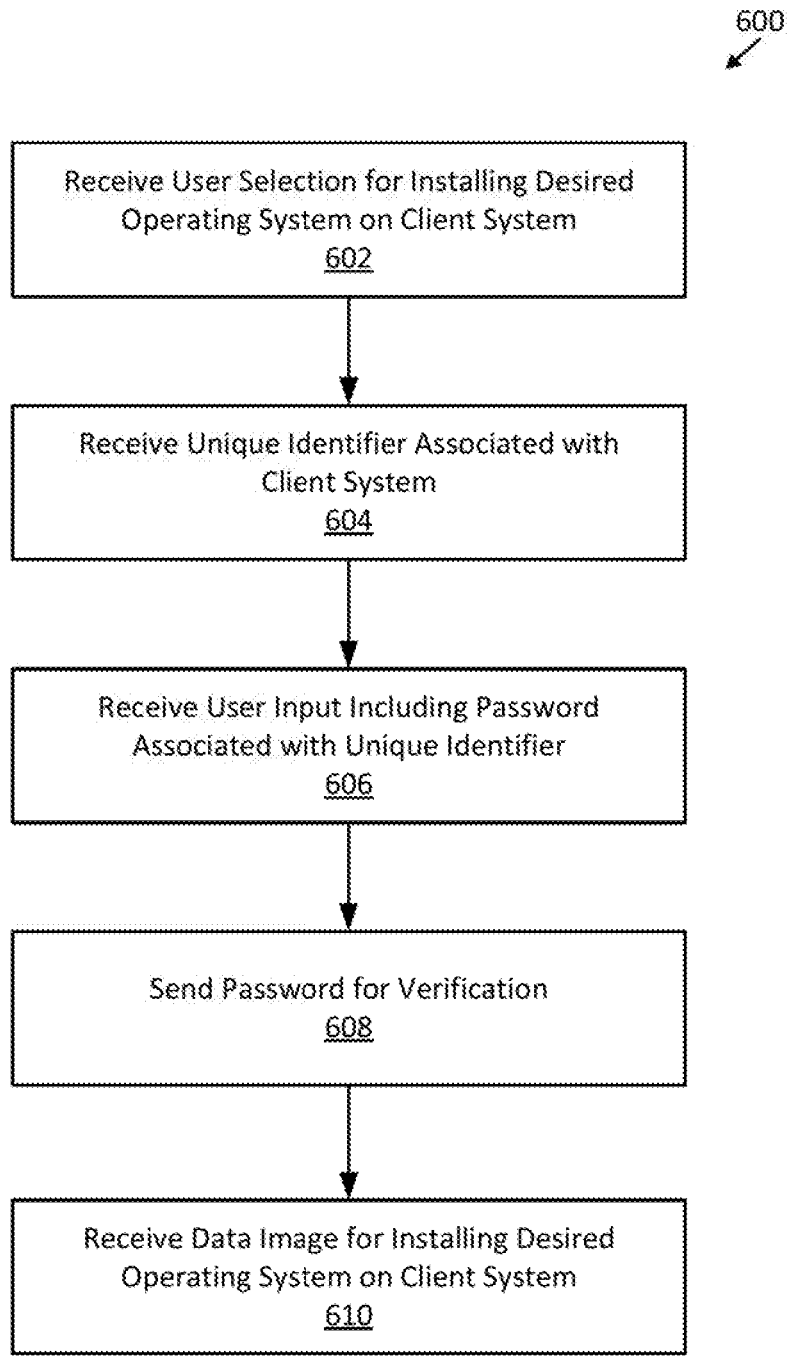

FIG. 6 illustrates an example methods 600 for receiving a data image at an example client system. Although execution of method 600 is described below with reference to the client system 102 and the server system 104 of FIG. 1, other suitable systems or devices for execution of method 600 can be possible, such as the client computing device 200 of FIG. 2, the server computing device 300 of FIG. 3, or the server computing device 400 of FIG. 4. The method 600 may be implemented in the form of executable instructions stored on a computer-readable medium or in the form of electronic circuitry.

In FIG. 6, method 600 begins at block 602, with the client system 102 receiving a user selection for installing a desired operating system on the client system 102. As described herein, the user selection may indicate an option for installing the desired operating system, such upgrading, downgrading, or reinstalling the desired operating system. Blocks 604, 606, 608, and 610 of method 600 may be similar to blocks 504, 506, 508, and 510 of method 500, which are described above with respect to FIG. 5.

Figure 7:
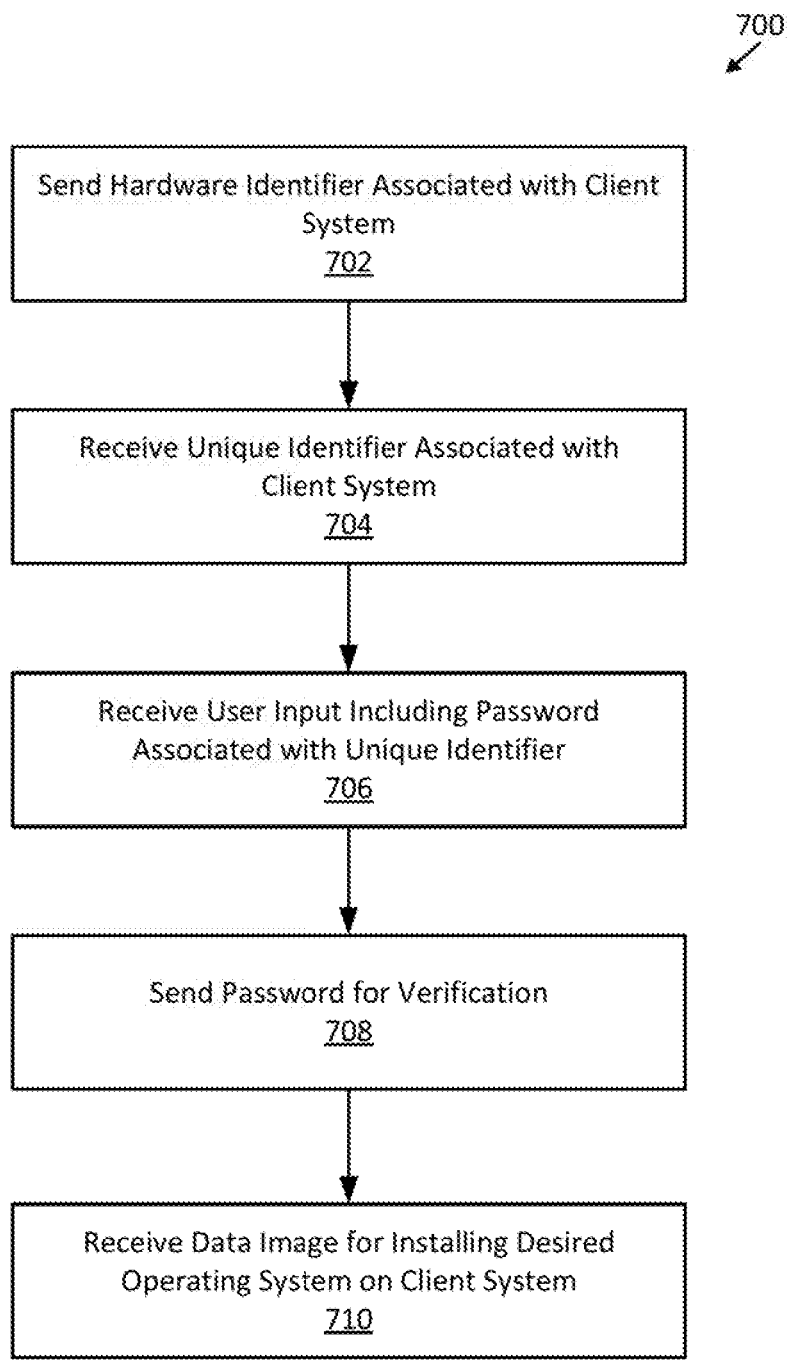

FIG. 7 illustrates an example methods 700 for receiving a data image at an example client system. Although execution of method 700 is described below with reference to the client system 102 and the server system 104 of FIG. 1, other suitable systems or devices for execution of method 700 can be possible, such as the client computing device 200 of FIG. 2, the server computing device 300 of FIG. 3, or the server computing device 400 of FIG. 4. The method 700 may be implemented in the form of executable instructions stored on a computer-readable medium or in the form of electronic circuitry.

In FIG. 7, method 700 begins at block 702, with the client system 102 sending a hardware identifier, associated with the client system 102, to the server system 104. As described herein, a hardware identifier associated with the client system may include a part number, a model number, a serial number, or the like. Blocks 704, 706, 708, and 710 of method 700 may be similar to blocks 504, 506, 508, and 510 of method 500, which are described above with respect to FIG. 5.

Figure 8:
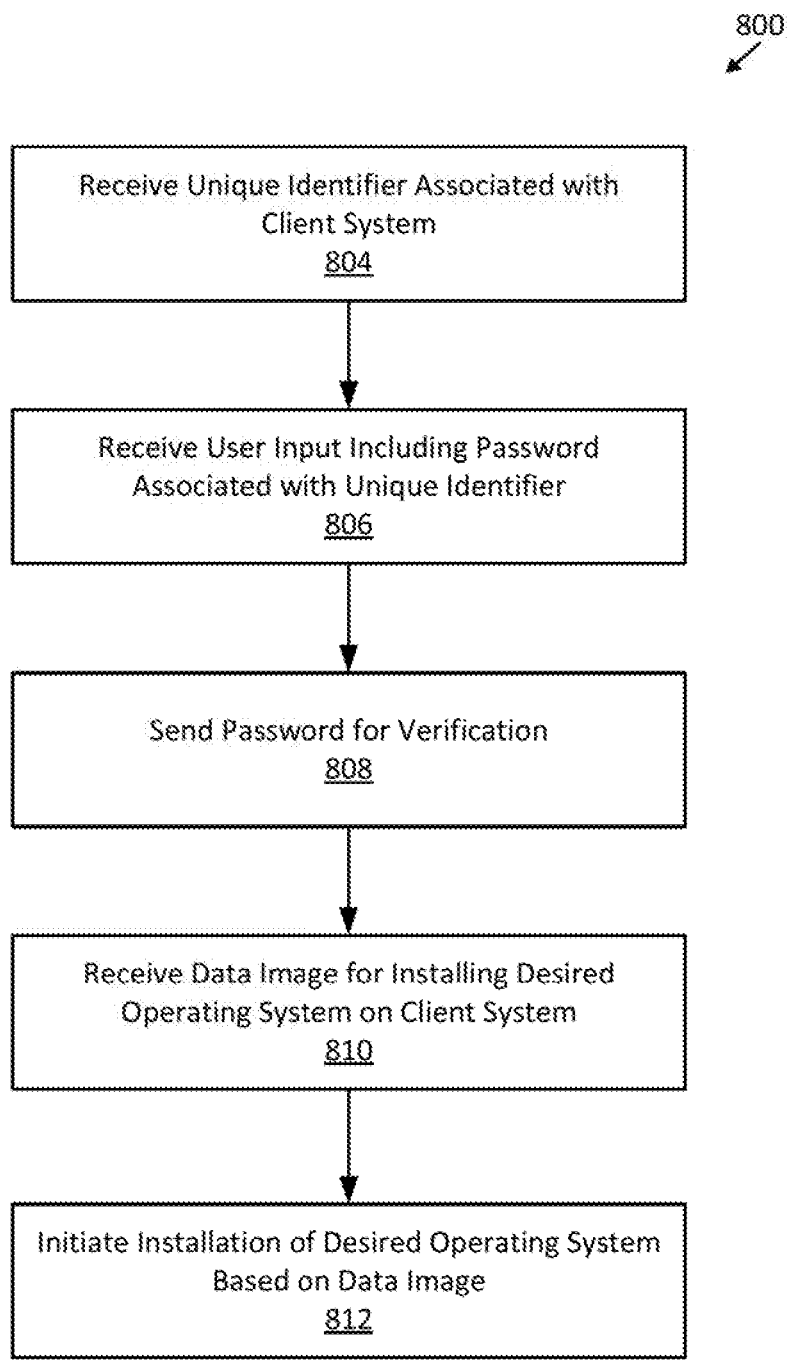
FIG. 8 illustrates an example method for receiving a data image at an example client system and initiating installation at the example client system based on the data image.

FIG. 8 illustrates an example method 800 for receiving a data image at an example client system and initiating installation at the example client system based on the data image. Although execution of method 800 is described below with reference to the client system 102 and the server system 104 of FIG. 1, other suitable systems or devices for execution of method 800 can be possible, such as the client computing device 200 of FIG. 2, the server computing device 300 of FIG. 3, or the server computing device 400 of FIG. 4. The method 800 may be implemented in the form of executable instructions stored on a computer-readable medium or in the form of electronic circuitry.

In FIG. 8, blocks 804, 806, 808, and 810 of method 800 may be similar to blocks 504, 506, 508, and 510 of method 500, which are described above with respect to FIG. 5.

Subsequent to block 810, method 800 continues to block 812, with the client system 102 initiating installation of the desired operating system based on the data image received at block 810. Additionally, the installation of the desired operating system based on the data image may be according to a user selection received from a client of the client computing device 200. For example, if a user of the client system 102 selects an option to upgrade, downgrade or recover an existing operating system based on the desired operating system, the installation of the desired operating system is initiated accordingly.

Figure 9:
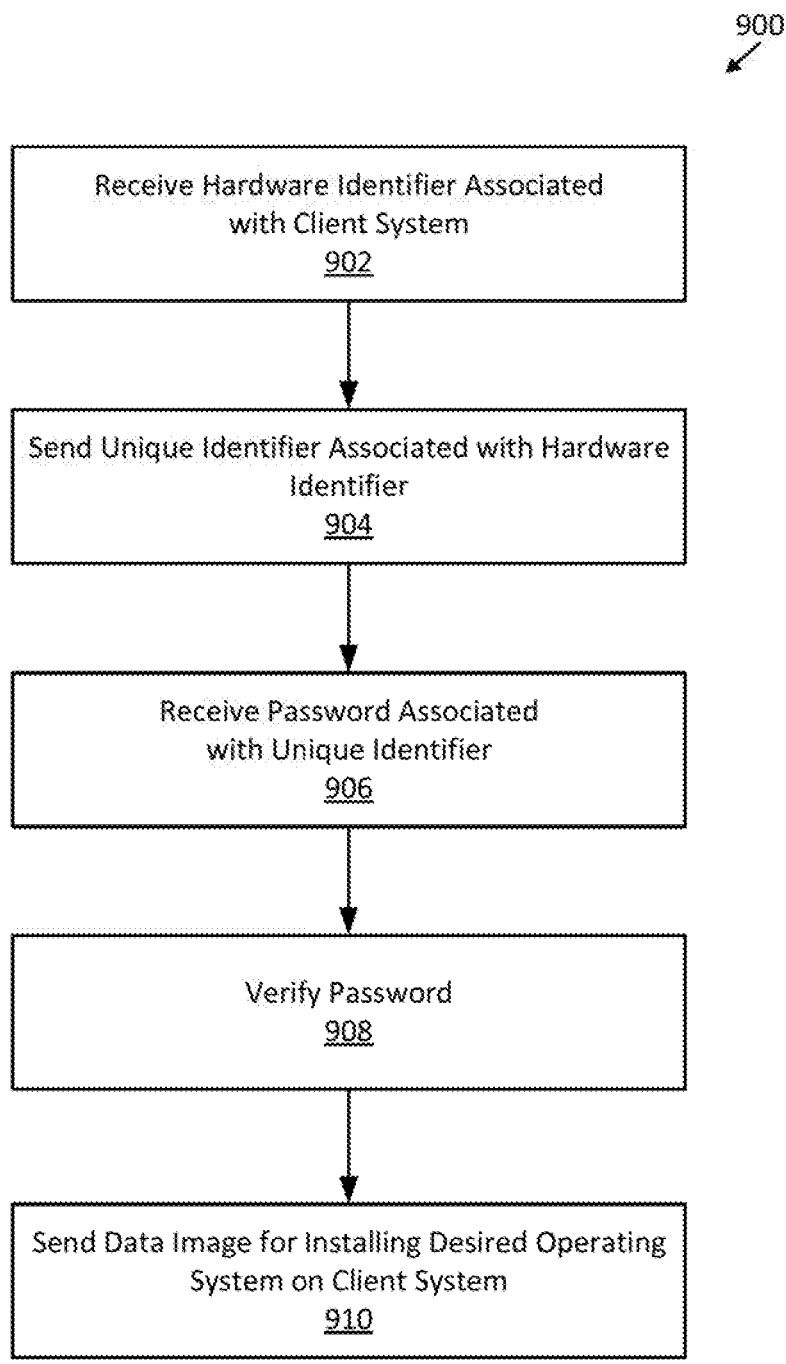
FIG. 9 illustrates an example method for sending a data image.

FIG. 9 illustrates an example method 900 for sending a data image. Although execution of method 900 is described below with reference to the client system 102 and the server system 104 of FIG. 1, other suitable systems or devices for execution of method 900 can be possible, such as the client computing device 200 of FIG. 2, the server computing device 300 of FIG. 3, or the server computing device 400 of FIG. 4. The method 900 may be implemented in the form of executable instructions stored on a computer-readable medium or in the form of electronic circuitry.

In FIG. 9, method 900 begins at block 902, with the server system 104 receiving a hardware identifier associated with the client system 102. At block 904, the server system 104 sends a unique identifier, associated with the hardware identifier received at block 902, to the client system 102. As described herein, the server system 104 sends the unique identifier to the client system 102 in response to the client system 102 providing the server system 104 with the hardware identifier associated with the client system 102.

At block 906, the server system 104 receives a password, associated with the unique identifier, from the client system 102. As described herein, the client system 102 may receive the password from a user at the client system 102, and the password may be one provided to the user by way of a call center or a website.

At block 908, the server system 104 verifies the password received at block 906. At block 910, the server system 104 sends the client system 102 a data image for installing a desired operating system on the client system 102. As described herein, the server system 104 may send the data image to the client system 102 in response to the password being successfully verified at block 908.

Figure 10:
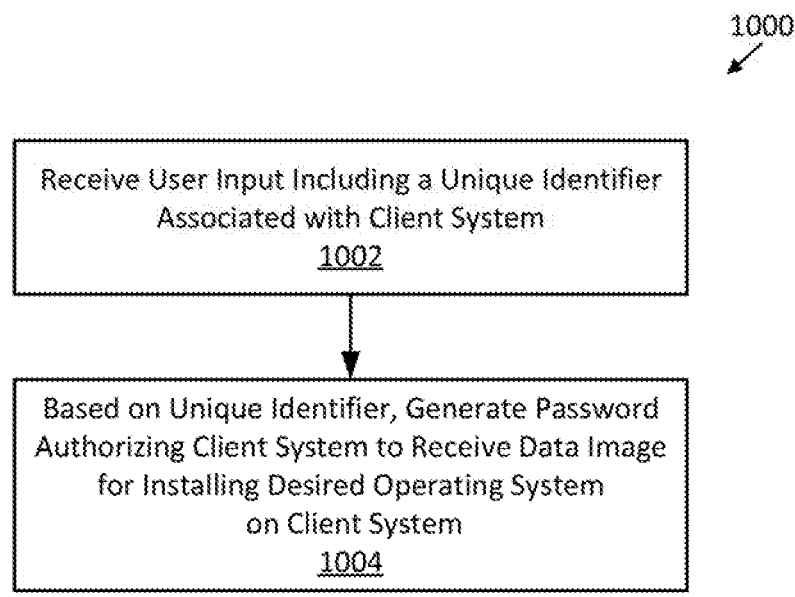
FIGS. 10-11 illustrate example methods for generating a password to authorize a client system to receive a data image.

FIG. 10 illustrates an example method 1000 for generating a password to authorize a client system to receive a data image. Although execution of method 1000 is described below with reference to the client system 102 and the server system 104 of FIG. 1, other suitable systems or devices for execution of method 1000 can be possible, such as the client computing device 200 of FIG. 2, the server computing device 300 of FIG. 3, or the server computing device 400 of FIG. 4. The method 1000 may be implemented in the form of executable instructions stored on a computer-readable medium or in the form of electronic circuitry.

In FIG. 10, method 1000 begins at block 1002, with the server system 104 receiving user input including a unique identifier associated with the client system 102. As described herein, the server system 104 may receive the user input including the unique identifier from a call center operator, who may have received the unique identifier from a user of the client system 102 during a telephone call. Based on the unique identifier received at block 1004, at block 1004, the server system 104 generates a password to authorize the client system 102 to receive a data image for installing a desired operating system on the client system 102.

Figure 11:
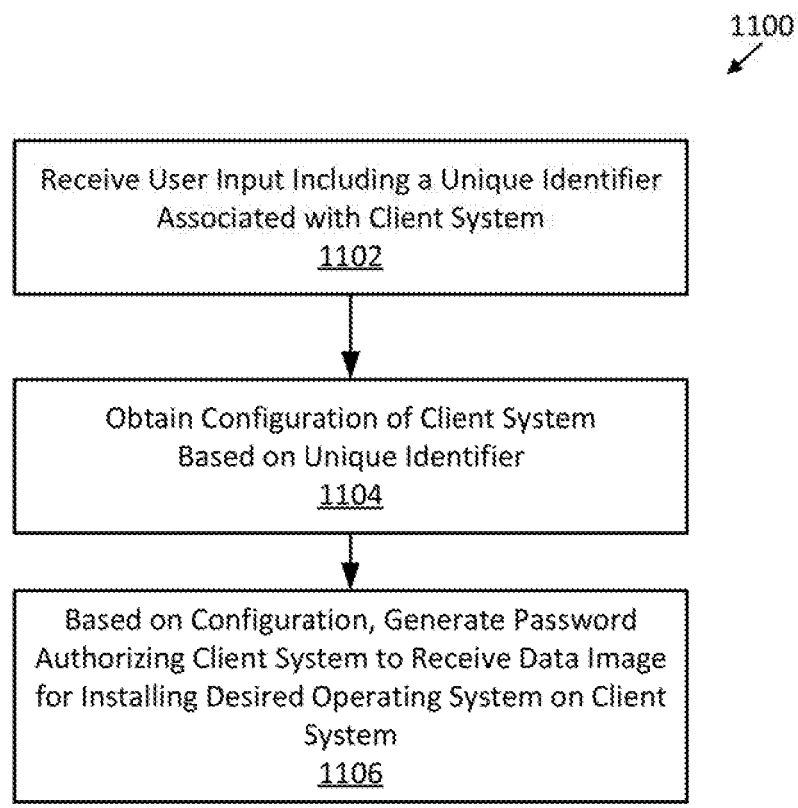

FIG. 11 illustrates an example method 1100 for generating a password to authorize a client system to receive a data image. Although execution of method 1100 is described below with reference to the client system 102 and the server system 104 of FIG. 1, other suitable systems or devices for execution of method 1100 can be possible, such as the client computing device 200 of FIG. 2, the server computing device 300 of FIG. 3, or the server computing device 400 of FIG. 4. The method 1100 may be implemented in the form of executable instructions stored on a computer-readable medium or in the form of electronic circuitry.

In FIG. 11, block 1102 of method 1100 may be similar to block 1002 of method 1000, which is described above with respect to FIG. 10. At block 1104, the server system 104 obtains a configuration of the client system 102 based on the unique identifier received at block 1102. Based on the configuration obtained at block 1104, the server system 104 generates a password at block 1106 to authorize the client system 102 to receive a data image for installing a desired operating system on the client system 102.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A non-transitory computer readable medium comprising instructions that upon execution causing a client computing device to:
    send, to a server computing device, a hardware identifier associated with the client computing device;
    receive, by the client computing device from the server computing device, a unique identifier associated with the client computing device, the unique identifier generated by the server computing device based on the hardware identifier received by the server computing device from the client computing device;
    send, over a network, the unique identifier;
    receive, over the network, a password obtained based on the unique identifier;
    receive, at the client computing device, a user input including the password based on the unique identifier;
    send the password included in the user input to the server computing device for verification; and
    receive, from the server computing device responsive to verification of the password sent to the server computing device, a data image for installing an operating system on the client computing device according to a user selection received at the client computing device.

2. The non-transitory computer readable medium of claim 1, wherein the instructions upon execution cause the client computing device to receive the user selection for installing the operating system on the client computing device.

3. The non-transitory computer readable medium of claim 1, wherein the instructions upon execution cause the client computing device to obtain the hardware identifier during a boot process of the client computing device.

4. The non-transitory computer readable medium of claim 1, wherein installing the operating system according to the user selection comprises restoring, upgrading, or downgrading, based on the operating system associated with the data image, an existing operating system currently installed on the client computing device.

5. The non-transitory computer readable medium of claim 1, wherein the password is a limited-use password.

6. The non-transitory computer readable medium of claim 1, wherein the instructions upon execution cause the client computing device to initiate installation of the operating system on the client computing device according to the user selection, the installation being based on at least a portion of the data image.

7. The non-transitory computer readable medium of claim 1, wherein installing the operating system according to the user selection comprises replacing an existing operating system, currently installed on the client computing device, with the operating system associated with the data image.

8. The non-transitory computer readable medium of claim 1, wherein the instructions upon execution cause the client computing device to install the operating system in the client computing device in which an existing operating system is not installed.

9. The non-transitory computer readable medium of claim 1, comprising a basic input/output operating system (BIOS) for the client computing device, wherein the BIOS comprises at least a portion of the instructions executable by the client computing device.

10. The non-transitory computer readable medium of claim 1, comprising a data partition to recover an existing operating system installed on the client computing device, wherein the data partition comprises at least a portion of the instructions executable by the client computing device.

11. The non-transitory computer readable medium of claim 1, wherein the password once verified by the server computing device, authorizes the client computing device to receive the data image.

12. The non-transitory computer readable medium of claim 1, wherein the hardware identifier associated with the client computing device comprises a hardware identifier of the client computing device or a hardware identifier of a component of the client computing device.

13. The non-transitory computer readable medium of claim 1, wherein the password sent to the server computing device is the password received over the network.

14. The non-transitory computer readable medium of claim 1, wherein the receiving of the password over the network comprises receiving the password from a website.

15. The non-transitory computer readable medium of claim 1, wherein the instructions upon execution cause the client computing device to:
    receive the user selection from among a plurality of options for installing the operating system,
    wherein the sending of the hardware identifier to the server computing device is subsequent to the client computing device receiving the user selection.

16. A client device comprising:
    a processor; and
    a non-transitory storage medium comprising instructions executable on the processor to:
        send, to a server device, a hardware identifier associated with the client device;
        receive, from the server device, a unique identifier associated with the client device, the unique identifier generated by the server device based on the hardware identifier received by the server device from the client device;
        send, over a network, the unique identifier;
        receive, over the network, a password obtained based on the unique identifier;
        receive, at the client device, a user input including the password based on the unique identifier;
        send the password included in the user input to the server device for verification; and
        receive, from the server device responsive to verification of the password sent to the server device, a data image for installing an operating system on the client device according to a user selection received at the client device.

17. The client device of claim 16, wherein the password sent to the server computing device is the password received over the network.

18. A method, comprising:
receiving, by a system comprising a processor, a hardware identifier associated with a client device;
generating, by the system, a unique identifier associated with the client device based on the hardware identifier associated with the client device;
sending, by the system to the client device over a network, the unique identifier associated with the client device;
receiving, by the system from the client device, a password obtained based on the unique identifier;
verifying, by the system, the password; and
sending, by the system to the client device, a data image for installing an operating system on the client device, the sending being in response to the password being verified.

19. The method of claim 18, wherein the receiving of the hardware identifier comprises receiving the hardware identifier sent by the client device to the system is responsive to a user at the client device selecting from among a plurality of options relating to installing the operating system on the client device.

20. The method of claim 18, further comprising:
receiving, by the system, the unique identifier; and
generating, by the system based on the received unique identifier, the password,
wherein the receiving of the password by the system from the client device occurs after the system has generated the password.

21. The method of claim 20, further comprising:
obtaining, based on the unique identifier received by the system, a configuration of the client device
wherein the generating of the password is based on the configuration.

* * * * *